United States Patent [19]

Kennedy et al.

[11] Patent Number: 4,619,948

[45] Date of Patent: Oct. 28, 1986

[54] COMPOSITE ACTIVE FILTER MATERIAL

[75] Inventors: T. Scott Kennedy, East Boothbay; Paul F. Herman, Boothbay Harbor, both of Me.

[73] Assignee: Twin Rivers Engineering, East Boothbay, Me.

[21] Appl. No.: 689,249

[22] Filed: Jan. 7, 1985

[51] Int. Cl.$^4$ .................. C08G 18/14; A24B 15/28; B29C 67/00

[52] U.S. Cl. ........................... 521/52; 131/332; 264/45.3; 264/46.4; 264/46.6; 264/140; 264/DIG. 13; 425/816; 523/204

[58] Field of Search .............. 521/52, 905, 99; 264/45.3, 46.4, 46.6, DIG. 13, 321, 140

[56] References Cited

U.S. PATENT DOCUMENTS

| | | | |
|---|---|---|---|
| 2,993,013 | 7/1961 | Wolfe | 260/2.5 |
| 3,178,300 | 4/1965 | Gemeinhardt et al. | 521/52 |
| 3,259,673 | 7/1966 | Ericson | 264/46.6 |
| 3,353,994 | 11/1967 | Welsh et al. | 521/52 |
| 3,538,020 | 11/1970 | Heskett et al. | 210/496 |
| 3,576,930 | 4/1971 | Watters et al. | 264/46.4 |
| 3,799,898 | 3/1974 | Lamplugh et al. | 521/52 |
| 3,805,532 | 4/1974 | Kistner | 61/36 R |
| 3,919,369 | 11/1975 | Holden | 264/45.3 |
| 4,088,132 | 5/1978 | Wood et al. | 128/285 |
| 4,137,200 | 1/1979 | Wood et al. | 521/159 |
| 4,167,612 | 11/1979 | Tucker et al. | 521/52 |
| 4,209,605 | 6/1980 | Hoy et al. | 528/54 |
| 4,230,566 | 10/1980 | Faudree | 521/99 |
| 4,258,100 | 3/1981 | Fujitani et al. | 428/317.9 |
| 4,259,452 | 3/1981 | Yukuta et al. | 521/52 |
| 4,311,543 | 1/1982 | Strickman et al. | 264/46.6 |

Primary Examiner—Herbert S. Cockeram
Attorney, Agent, or Firm—Daniel H. Kane, Jr.

[57] ABSTRACT

A reticulated hydrophilic foam substrate and bonded active surface particle powder composite filter material is generated by foam polymerization of a prepolymer phase with an aqueous phase. The reticulated hydrophilic foam substrate is characterized by relatively low pressure drop and low resistance to flow through the foam substrate. The prepolymer phase is a hydrophilic polyurethane prepolymer receptive to the aqueous phase for foam polymerization upon mixing with the aqueous phase. The aqueous phase in turn is a pourable and flowable slurry mixture of water, active surface particle powder, and surfactant wetting agent. The aqueous phase includes sufficient water or other evaporable liquid to provide a protective liquid layer or coating over the active surfaces of the powder particles. Upon polymerization of the mixture the active surface powder particles are distributed over and bonded to the webs of the reticulated hydrophilic foam and the major portion of the active surfaces are free from obstruction and available for active filter functioning. The aqueous phase and prepolymer phase upon mixing may be poured, flowed, or injected into a suitable respirator or mask mold to provide a lightweight single piece respirator face mask.

45 Claims, 6 Drawing Figures

COMPOSITE ACTIVE FILTER MATERIAL

TECHNICAL FIELD

This invention relates to a new active filter material incorporating active surface particle powder such as activated charcoal powder, ion exchange resin beads, catalyst material, molecular sieves, electrostatic scrubber media, etc. and to useful applications in filters for filtering or treating fluids, both liquids and gases.

BACKGROUND ART

A variety of single piece lightweight respirators and masks are available in the form of facepieces which cover the nose and mouth and provide breathing protection from dust and particulate matter. Such single piece disposable dust respirators, however, are unable to exclude undesirable vapors and gases. In order to filter or treat organic vapors and gases, more complex respirators and masks are required incorporating cartridges or chambers confining an active filter material through which breathing air passes for filtering or treatment. Such full mask and half-mask facepieces and respirators are generally more cumbersome and heavier in weight, with more complex construction required for safely confining and containing the active filter material in the cartridge through which breathing air passes.

The conventional cartridge type filter or respirator uses a cartridge of porous or perforated end walls containing relatively large mesh granulated or pelletized activated carbon. The end walls typically include a porous membrane and a perforated structural screen. The relatively large mesh size of the granules or pellets packed between the porous end walls of the cartridge is selected to afford low pressure drop restriction across the cartridge particularly in respirator applications to minimize resistance to the breathing air flow. Minimizing the pressure drop and resistance to flow by selection of large size granules or pellets, however, reduces the surface area exposure of the active surface material comprising the granules or pellets. Surface area exposure of the active surface material such as activated carbon or charcoal is optimized using active surface particle powder of powder mesh sizes, for example, Tyler or U.S. Standard Screen Mesh Size 200 and smaller and preferably fine powder Tyler or U.S. Standard Screen Mesh Size of at least 325 and smaller. Applications for packed powder and fine powder filter cartridges, however, are generally limited to filtering liquid fluids and to liquid purification because the high pressure drop across packed powder is unsuitable for vapor and gas filtering and breathing applications.

The use of high exposure surface area powder and fine powder active surface material such as activated carbon and charcoal powders of mesh size finer than 200 mesh and preferably finer than 325 mesh have not been available for vapor and gas filtering applications. The powder material must be securely confined to eliminate breathing hazards or release of the powder. Such cartridge elements exhibit high resistance to vapor and gas flow. As a result no active filter material or medium is available which combines the advantages of the high exposure surface area of active surface powders and fine powders with the low resistance to flow and low pressure drop of packed granules and pellets of larger mesh size.

Furthermore, even for liquid filtering applications, a disadvantage of present methods is that fine powder may be released into the liquid, or the powder is intentionally mixed with the liquid and extended settling time or contrifugation is thereafter required.

OBJECTS OF THE INVENTION

It is therefore an object of the present invention to provide a new active filter material incorporating high surface area exposure active surface particle powder such as activated charcoal powder with relatively low pressure drop and low resistance to flow. The active filter material may be applied in a variety of fluid filtering and treating applications including liquid filters and vapor and gas filters.

Another object of the invention is to provide a new method for forming an active filter composite material securely bonding active surface particles and powders to a low pressure drop substrate with low breathing resistance and low resistance to flow and for safely securing the active surface particle powder to the substrate without blocking or deactivating the active surfaces for both gas and liquid filtering and treatment applications.

A further object of the invention is to provide a new active filter material which may be rendered in a variety of configurations by molding, slicing and shredding for liquid and gas filtering and treatment applications, and which may provide, for example, new vapor and gas respirator masks and fluid filters of single piece lightweight construction.

DISCLOSURE OF THE INVENTION

In order to accomplish these results the present invention provides a reticulated hydrophilic foam substrate and bonded active surface particle powder composite generated by foam polymerization of a prepolymer phase with an aqueous phase. The reticulated hydrophilic foam substrate is characterized by relatively low pressure drop and low resistance to flow through the foam substrate.

According to the invention the reticulated foam substrate is derived from an aqueous phase, and a prepolymer phase in the form of a hydrophilic polyurethane prepolymer receptive to the aqueous phase for foam polymerization upon mixing with the aqueous phase. The aqueous phase in turn is a pourable and flowable slurry mixture of water, active surface particle powder, and surfactant wetting agent. The aqueous phase includes sufficient water to provide a liquid carrier for a pourable and flowable aqueous phase and for providing a protective liquid layer or coating over the active surfaces of the powder particles.

The aqueous phase and prepolymer phase are mixed together in substantially equal proportions by weight or greater proportion by weight of the aqueous phase. For example, the aqueous phase and prepolymer phase are mixed in the range of ratios of approximately 1/1 to 8/1 by weight so that the mixture is initially pourable and flowable for molding and the active surface areas are protected by a temporary evaporable coating or barrier.

Upon polymerization of the mixture, using the relative proportion of ingredients according to the invention, there results a reticulated hydrophilic foam substrate with the active surface powder particles distributed over and bonded to the webs of the reticulated hydrophilic foam. A feature and advantage of the method and resulting active filter material, according to the invention, is that the major portion of the active surfaces of powder particles are substantially protected by a hydration layer from obstruction and deactivation during the foam polymerization. The resulting composite material is therefore effective for active filter functioning after molding in the desired configuration.

In a preferred form of the invention the aqueous phase and prepolymer phase upon mixing are poured, flowed, or injected into a suitable mold such as, for example, a respirator or mask mold having a thickness at the center of, for example 1 to 2 cm tapering to a flange portion on the periphery for appropriate face mask fitting of the respirator mask. The relative proportions of the mixture ingredients for foam polymerization are selected to afford a low breathing resistance reticulated substrate to which the active surface powder particles are securely bonded. The aqueous phase comprises surfactants to enhance open cell reticulation and produce a reticulated foam.

According to another feature of the invention the flange and periphery of the mask may be covered with an impervious layer or skin, for example, of polyvinyl to direct breathing air through the thicker central portions of the respirator. Finishing of the respirator face mask in this manner may be accomplished by, for example, spraying liquid polyvinyl around the perimeter of the mold prior to pouring or injecting the polymerizing mixture of the prepolymer phase and aqueous phase into the respirator mold. The layer of liquid polyvinyl thereafter bonds to the polymerizing mixture forming an impervious skin of vinyl over the flange portion and perimeter portion of the respirator.

A feature and advantage of the method, according to the present invention, for preparing the active filter material is that the activated carbon or charcoal powder particles are bound throughout the reticulated foam substrate without plugging, deactivating or passivating the active surfaces of the particles which otherwise might occur during the polymerization reaction. This is accomplished by first soaking the active surface powder particle such as activated carbon or charcoal powder in a protective liquid vehicle or carrier such as water or a volatile fluid such as Freon (TM) fluorocarbon solvent liquid or other evaporable inert organic liquid. The protective liquid is a reasonably volatile, evaporable or vaporizable liquid and serves to provide a temporary protective layer or coating over the surface of the particles, filling the valleys and irregular contours. Where the powder particles are first immersed in Freon TM or other volatile liquid, the mixture is then added to water or other aqueous reactant along with a surfactant to provide the aqueous phase. Where the protective layer is provided by water, the water itself provides a strong hydration barrier or coating over the surface of the particle.

The aqueous phase includes appropriate surfactants including anionic, nonionic, cationic, or amphoteric surfactants to assure wetting and temporary protective coating of the valleys and activated surfaces of the particles. The water, active surface particle powder, and surfactants comprising the aqueous phase are then mixed with the prepolymer phase to provide the reticulated hydrophilic foam substrate and bonded active surface particle powder composite. The mixture may be poured, flowed or injected into a suitable mold. After polymerization and formation of the foam substrate, the temporary permeation barrier liquid such as water or other volatile fluid is then driven off by natural evaporation which may be accelerated by applied heat leaving the exposed active surfaces intact to perform the filtering function.

In the active filter material composite of the present invention the polymer bonds only to exposed peaks or portions of the active surface particles, securely binding the particles to the webs of the reticulated foam but without plugging the major portions of the active surfaces. The secure binding of the active surface particle powder to the foam substrate achieved during the polymerization process is essential for the filtering function in respirators and masks. A feature and advantage of the invention is that the high surface area exposure afforded by powders and fine powders is combined with the low pressure drop of the reticulated foam substrate. Yet the powder is securely bonded in place.

This is to be contrasted with prior art methods in which a foam is impregnated with carbon black particles after the foam has been formed, a post polymerization impregnation. Thus, according to prior art methods the carbon black particles are added after the polymer is foamed and cured, for example, as described in U.S. Pat. No. 4,088,132. Such post-impregnation does not provide the secure bonding necessary for safe application, for example, in respirators and filters or for liquid filtering and is intended to improve physical characteristics of the foam such as load bearing characteristics or electrical conductivity.

According to another feature and advantage of the invention, active surface particle powder such as activated carbon or charcoal powder having a fine powder mesh of substantially at least 325 mesh or smaller is used to maximize surface area exposure of the activated surfaces, thereby maximizing the active filter function of the composite material. This is to be contrasted with prior art methods using hydrophilic urethane prepolymers and polyurethane resins for adhesively bonding large mesh size aggregate particles together with relatively little bubble formation in a closely packed matrix such as described, for example, in U.S. Pat. Nos. 3,538,020 and 3,805,532. In these applications the urethane prepolymer or polyurethane resin is incorporated in the matrix as a bonding agent or glue between the closely packed aggregate granules and not as a reticulated foam substrate with low pressure drop nor with secure bonding of active surface fine powder particles over a substrate web.

A feature and advantage of the present invention is that the active filter material generally bears the physical characteristics of the hydrophilic polyurethane foam substrate. Thus the active surface filter material provides a flexible, unitary and moldable filter medium for single piece or unitary filter applications such as simple respirators and face masks. While the active filter material bears the advantageous physical characteristics of the flexible reticulated foam substrate, it also bears over its surfaces the securely bonded active surface particle powder for active filter functioning through a relatively low pressure drop and low breathing resistance medium. In the preferred form the active surface particle powder such as activated charcoal powder comprises 12% to 66% by dry weight of the dried composite material. This is achieved by incorporating the powder in the aqueous phase as an aqueous slurry comprising approximately 15% to 50% by weight and preferably at least 30% by weight of powder. A variety of different active powder particles may be used according to the intended application of the active filter material including activated charcoal powder, ion exchange resin beads, catalyst material, molecular sieves, electrostatic scrubber media, etc.

For liquid filtering applications, the invention provides even greater bonding of the active surface powder particles to the reticulated foam substrate by adding an organo functional silane additive to the aqueous phase. The greater adhesion assures secure particle retention even in a liquid flow. A rock powder filler material such as calcium metasilicate may also be added to increase the specific gravity of the active filter material so that it sinks in water or other liquid to be filtered.

The tensile strength of the foam substrate and the active filter material may be varied according to the application by varying the ratio of aqueous phase to polymer phase over the range of ratios of, for example, approximately 1/1 to 8/1. For higher tensile strength applications in molded products and for slicing or cutting into sheets a higher proportion and higher density of polymer is used in the 1/1 ratio end of the range. For a more friable substrate and active filter material suitable, for example, for shredding to a desired mesh size of fragmented pieces of active filter material, a higher proportion of aqueous phase is used at the higher end of the ratio range, for example, in the vicinity of 5/1.

A feature and advantage of the shredded, ground or fragmented form of the active filter material is that it may be substituted in cartridge filter type applications while still using the higher surface area fine powder activated surface particles rather than larger granules. The shredded or fragmented foam itself provides the granules with lower pressure drop and reduced resistance to flow, but as a granular substrate securely supporting and binding fine powder activated charcoal or other active surface particles. Furthermore, the shredding or grinding may increase the activity of the filter material by tearing back foam substrate material and exposing more of the active surfaces.

The present invention utilizes a variety of hydrophilic urethane prepolymers in the prepolymer phase for reaction with the aqueous phase to provide the reticulated foam substrate of the active filter composite material. The class of hydrophilic urethane prepolymers including, for example, the isocyanate and polyisocyanate terminated or capped polyoxyalkylene ethers including polyoxyethylene polyol prepolymers are described, for example, in U.S. Pat. No. 4,137,200 for "Cross Linked Hydrophilic Foams and Method"; U.S. Pat. No. 4,209,605 for "Process for Producing Shaped Polyurethane Hydrogel Articles"; U.S. Pat. No. 2,993,013 for "Cellular Polyurethane and Method of Preparing Same"; and U.S. Pat. No. 3,805,532. For example, column 4 of the U.S. Pat. No. 4,209,605 describes a variety of illustrative polyisocyanates and polyols as do columns 2 and 3 of U.S. Pat. No. 4,137,200. General procedures for the preparation of prepolymers are described by J. H. Saunders and K. C. Frisch in *Polyurethanes Chemistry and Technology*, Interscience Publishers, John Wiley & Sons, New York, Vol. XVI, Part 2, High Polymer Series, "Foam Systems" pages 7-26, and "Procedures for the Preparation of Prepolymers" pages 26 et seq.

BRIEF DESCRIPTION OF THE DRAWINGS

FIG. 4 is a side view of the active filter material vapor and gas respirator mask while FIG. 5 is a diagrammatic side cross sectional view.

DESCRIPTION OF PREFERRED EXAMPLE EMBODIMENTS AND BEST MODE OF THE INVENTION

Figure 1:
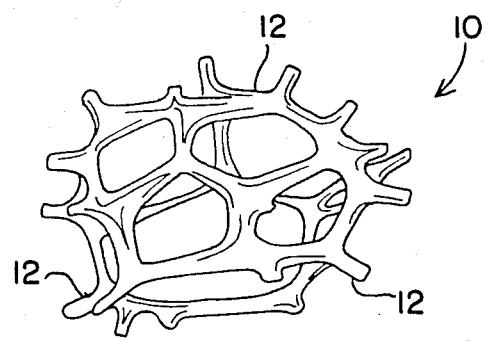
FIG. 1 is a detailed fragmentary view of the structure of a reticulated hydrophilic polyurethane foam of the prior art.

The detailed structure of a reticulated foam such as reticulated polyurethane foam is shown in the fragmentary view of FIG. 1. Such a reticulated foam 10 is composed of a three dimensional network, matrix or substrate of continuously joined webs 12. The webs are composed of the polyurethane or other polymer resin constituting the foam and form continuously joined loops and rings in a three dimensional array. Such a reticulated foam structure is distinguished, for example, from closed cell and open cell foams. The closed cells foams are impervious, filled with enclosed spherical or polyhedral bubbles in a three dimensional array. In open cell foams the spherical or polyhedral bubbles are formed with open windows. Such open cell foams are pervious to fluids but the polyurethane or other polymer resin forming the partial walls of the cells has not withdrawn entirely to form the ligaments or webs of a reticulated foam.

Whether or not a reticulated foam, open cell foam or closed cell foam is formed during foam polymerization depends upon the relative quantities of ingredients and method of polymerization as is well known in the polymer field. See e.g. Saunders and Frisch cited above. In particular, the relative proportion of surfactants in the aqueous phase and foam polymerization mixture influence the structure of the foam, and the formulae of ingredients according to the present invention as set forth in the following examples is selected and proportioned to produce reticulated hydrophilic polyurethane foams. While open cell foams are operative in the present invention, reticulated foams provide the preferred embodiments.

Figure 2:
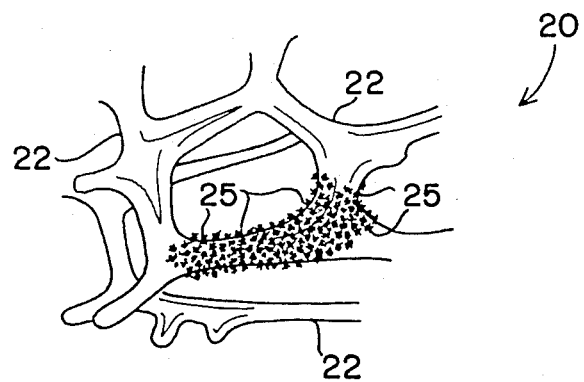
FIG. 2 is a detailed fragmentary diagrammatic view of an exemplary active filter material according to the invention showing the reticulated hydrophilic polyurethane foam substrate and bonded activated charcoal powder composite.

The structure of the reticulated hydrophilic foam substrate and bonded active surface particle powder composite providing active filter material according to the present invention is shown in FIG. 2. In the active filter material the reticulated hydrophilic polyurethane foam 20 provides the substrate of webs or ligaments 22 in a three dimensional network or matrix of loops or rings with activated charcoal powder particles 25 bonded to the surfaces of the webs and ligaments covering, for example, at least 50% of the surface area of the webs and ligaments 22. In the example of FIG. 2, the bonded activated carbon powder is shown for simplicity over only a portion of the substrate surface.

The activated charcoal or carbon powder is selected to have a mesh size of approximately 200 or smaller and preferably is selected to be a fine powder of approximately at least mesh size 325 and smaller. The preferred fine powder size is exemplified by, for example, activated carbon Type YF TM available from Barnebey-Cheney, 835 North Cassidy Ave., P.O. Box 2526, Columbus, Ohio 43216. According to these specifications the fine powder is defined as a powder particle size 95% of which passes through mesh 325, U.S. Screen, ASTM D-2862. Another fine powder 325 mesh activated charcoal, Grade 950 is available from Witco Chemical Corporation, 520 Madison Ave., New York, N.Y. 10022. The medium powder particle size is exemplified by activated carbon Type YF TM available from Barnebey-Cheney. The medium powder particle size is defined to mean a powder 80% of which passes through the 200 mesh screen. Such activated charcoal or carbon powder affords extremely large extended surface area, for example, over 100 acres per pound (2.2 kg) and as high as 9,000,000 square feet in one pound (2.2 kg). The active filter function of the activated charcoal powder particles 25 bonded over the surfaces of the webs 22 of reticulated foam substrate 20 is accomplished by adsorption of the target vapors, gases or other fluids over the extended and involuted surface area. When the adsorptive capacity of the exposed powder surface areas of the active filter material composite is saturated, the active filter material and bonded active surface powder may be reactivated according to the well known methods by application of heat, steam, nitrogen or other appropriate acid, alkali or solvent chemical agent.

Figure 3:
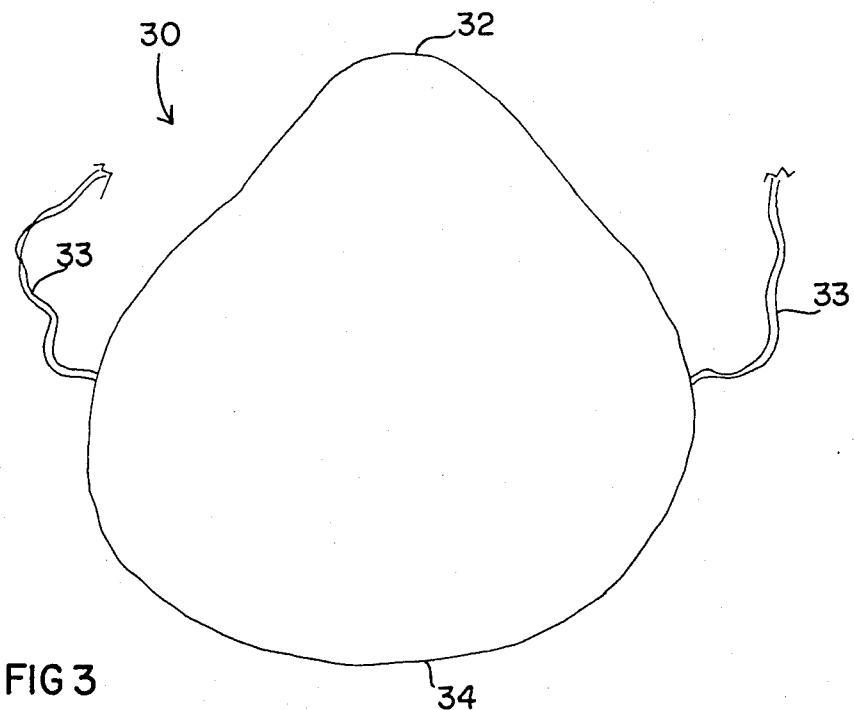
FIG. 3 is a plan view of a single piece lightweight active filter material vapor and gas respirator mask according to the invention.
Figures 4, 5:
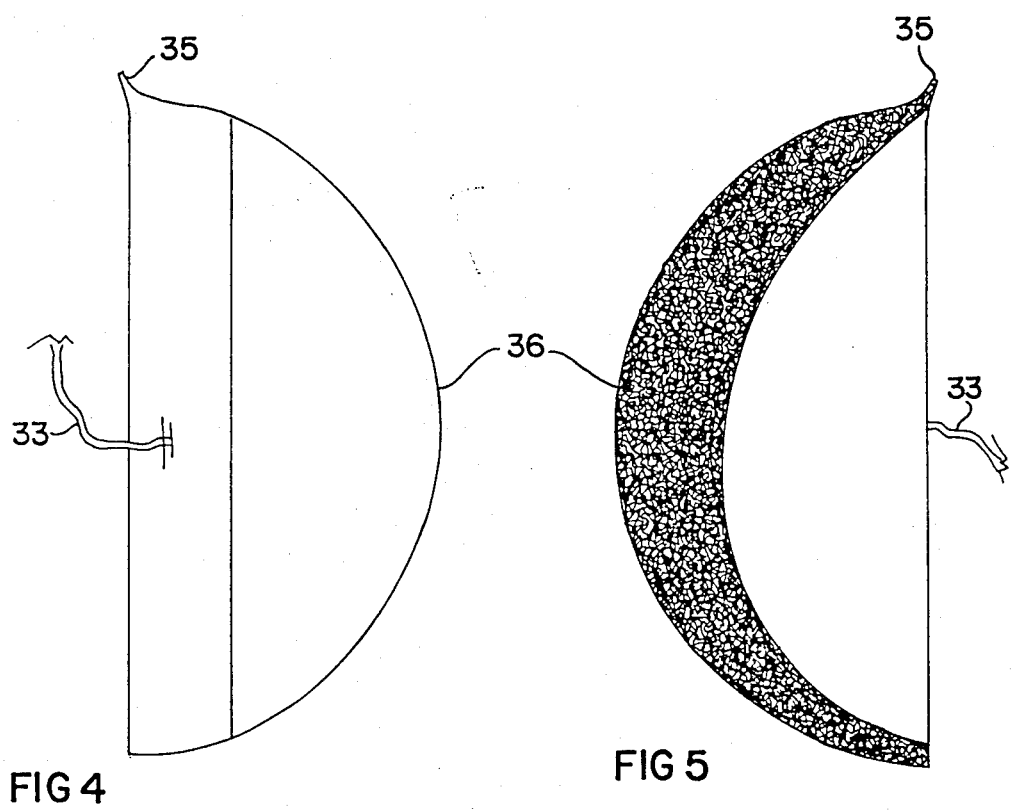

A single piece, lightweight respirator or face mask, according to the invention, is illustrated in FIG. 3. According to this preferred embodiment the active filter composite material produced in accordance with the following examples is molded during foam polymerization in a suitable respirator or face mask mold having inside dimensions and configuration conforming to the shape of the respirator mask as shown in FIGS. 3, 4, and 5.

Referring to those figures, the respirator mask 30 includes a nose portion 32 and chin portion 34 of appropriate shape for covering the nose, mouth and lower half of the face for filtering breathing air. An appropriate band 33 such as an elastic band or adjustable band is attached to the sides of the mask 30 for securing in position. As shown in FIGS. 4 and 5 the perimeter of the mask 30 is formed with a flange portion 35 which abuts against and conforms to the contours of the face to exclude breathing air from entering under the side of the mask.

The respirator mask 30 is formed with the thickened or widest cross section of active filter material at the center 36 of the mask, for example 1 to 2 cm in thickness, tapering to a lesser thickness at the perimeter flange 35 to maximize flexibility of the flange in conforming to facial features and contours. As shown in the cross sectional diagrammatic view of FIG. 5 the active filter material comprising the respirator mask is characterized throughout by the reticulated foam substrate and bonded activated charcoal or carbon powder composite structure as illustrated in FIG. 2.

Figure 6:
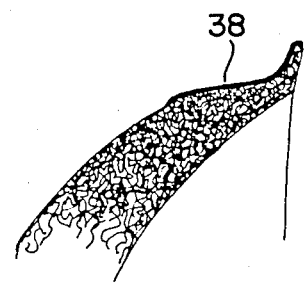
FIG. 6 is a fragmentary diagrammatic side cross section of an edge of the respirator mask showing an impervious skin of plastic around the perimeter and flange to increase the pressure drop around the margin of the mask.

According to the preferred embodiment shown in the detailed fragmentary diagrammatic view of FIG. 6 an impervious skin 38, such as, for example, a polyvinyl chloride layer may be formed over the perimeter boundary and flange of the mask to increase pressure drop at the tapered perimeter thereby constraining breathing air to pass through the thicker or wider cross section central portions of the mask for greater filtering action. This can be accomplished by applying the polyvinyl layer after molding and formation of the respirator or by applying liquid polyvinyl around the perimeter of the mold, for example by spraying, prior to introduction of the foam polymerizing mixture into the mold. By this expedient the impervious skin 38 is bonded to the active filter material at the perimeter of the mask.

EXAMPLE 1

A face mask respirator was prepared according to the following procedure and ingredients. The aqueous phase was prepared by mixing in 30.41 grams of water, 21.72 grams of 80×325 mesh high surface area, coke based activated charcoal powder having 1000 to 1200 square meters per gram surface area. The fine powder activated charcoal with the foregoing specifications was obtained from Witco Chemical Corporation, 520 Madison Ave., New York, N.Y. 10022. Also mixed in the aqueous phase were two surfactants, 6.51 grams of Schercopol OMS-NA TM, a disodium monooleamide MEA surfactant obtained from Scher Chemical Company, and 2.17 grams of another surfactant, polypropylene glycol (PPG 1025) having molecular weight of 1025. The proportions of PPG 1025 and Schercopol OMS-NA were mixed in the aqueous phase as surfactants to facilitate wetting the extended surface area of the activated charcoal fine powder. The relative percentage by weight of each of the ingredients of the aqueous phase are indicated in Table I.

For the prepolymer 39.19 grams of TREPOL polyurethane prepolymer was used. TREPOL is a polyether urethane prepolymer of toluene diisocyanate terminated polyethylene glycol with a less than 6% available unreacted NCO groups and isocyanate functionality less than 2, available from Twin Rivers Engineering, Route 96, East Boothbay, Me. 04544.

The relative percentages by weight of all ingredients are indicated in Table I. Approximately 60.81 grams of aqueous phase was mixed with 39.19 grams of prepolymer phase with a wet weight ratio of 1.55 to 1. The foam polymerizing aqueous phase and prepolymer phase mixture was introduced by pouring into the face mask mold with completion of the foam polymerization reaction filling out the mold and with excess venting outside the mold. A Brulin mold release Permamold 480-M TM was used. Thus by wet weight, the foam polymerization mixture was approximately 60% aqueous phase and 40% prepolymer phase as a ratio of approximately 1.5/1. Because the foam polymerization reaction is exothermic, slight heat is developed elevating the temperature of the mixture in the mold to approximately 110° F. After setting for approximately 6 to 7 minutes in the mold the face mask was removed and air dried with air evaporation of excess water leaving approximately only 2% by weight of the original water in the resulting foamed polymer. Air drying at room temperature may extend over a period, for example, 8 hours.

Thorough mixing together of the aqueous and prepolymer phases is important for uniform density and reticulated structure of the resulting foam substrate. This may be accomplished by introducing the separate aqueous and prepolymer phases together through stirring blades, or a rotary mixer, etc.

The mold, according to the present example, included an opening vent for release of excess foaming polymer. The density of the resulting open reticulated foam, however, may to some extent be controlled by blocking the vent on the mold to contain the desired quantity by weight of reactants to achieve the desired density. This determination of density must take into account that most of the water is excess water which subsequently evaporates during air drying of the molded product leaving only approximately 2% by weight of the water in the resulting foam polymer composite material.

to give smaller cell size and higher density according to the specifications required for the active surface filter material.

During the foam polymerization reaction upon mixing of the aqueous phase and prepolymer phase the surfactants added in the quantities and proportions according to the present invention break windows in the forming foam bubbles or cells by breaking down surface

TABLE I

| INGREDIENT | DESCRIPTION OR SOURCE | % AQ. PHASE | % PREPOLYMER PHASE | % TOTAL WET WEIGHT |
|---|---|---|---|---|
| WATER | DEIONIZED | 50.0 | | 30.41 |
| PPG 1025 | SURFACTANT | 3.57 | | 2.17 |
| SCHERCOPOL OMS-NA | SCHER CHEMICAL SURFACTANT | 10.70 | | 6.51 |
| ACTIVATED CHARCOAL POWDER | GRADE 950 80 × 325 MESH WITCO CHEMICAL | 35.72 | | 21.72 |
| TREPOL | PREPOLYMER | | 100% | 39.19 |

EXAMPLES 2-5

Examples 2-5 for producing the reticulated hydrophilic polyurethane foam substrate and bonded active surface particle powder composite filter material are summarized in Table II. The first eight ingredients in order from top to bottom of Table II represent ingredients of the aqueous phase which are mixed in water in Examples 2, 4, and 5 as the aqueous reactant. In Example 3 the aqueous phase ingredients are mixed in liquid soap containing sufficient water to constitute the aqueous reactant. At the same time the soap in solution provides one of the surfactants to assure wetting coverage and protection of the tortuous surfaces of the activated charcoal. In example 2 the surfactant is Pluronic F88 TM available from BASF. In Examples 2, 4, and 5 polypropylene glycol (PPG) and Schercopol OMS-NA TM provide additional surfactants. The fine powder mesh activated charcoal powder of Example 1 was also used in Examples 2-5 in the quantities and proportions shown in Table II.

The prepolymer phase consisted of TREPOL polyurethane prepolymer available from Twin Rivers Engineering, Route #96, East Boothbay, Me. 04544. The TREPOL prepolymer is a polyisocyanate terminated polyethylene polyol in which the prepolymer molecules have a reaction functionality less than 2. Thus the reaction product of the polyisocyanate such as toluene diisocyanate and the polyethylene glycol such as PEG 1000 is void of reactive hydroxy groups while containing on the average less than 2 reactive isocyanate sites or groups per molecule. Thus the average isocyanate functionality or NCO group functionality is less than 2. The consistency or viscosity of the prepolymer is approximately that of honey with a viscosity of, for example, approximately 3,000 cps.

According to the method for forming the active filter material, no heat need be added during mixing and reaction of the aqueous phase and prepolymer phase, and the exothermic reaction generates some heat of its own. However, prior to mixing, the prepolymer may be maintained at, for example, 90° F. with external heat to lower the viscosity of the prepolymer so that it is more flowable and easier to pump to a reaction mixing zone. Maintaining the prepolymer at a higher temperature before mixing also decreases the subsequent foam polymerization reaction time. On the other hand, the aqueous phase may be advantageously controlled by cooling tension and the further action of the surfactants results in the desired reticulated foam substrate according to the preferred structure of the present invention. While an open cell foam as opposed to a reticulated foam is also operative according to the invention, it is less desirable because the remnant walls of the bubbles and cells around the formed windows obscure and cover activated surface powder particles bonded in the foam matrix. On the other hand, the reticulated web structure maximizes surface exposure and minimizes pressure drop.

The immediate molded product from the foam polymerization reaction after 3 to 7 minutes in the mold is wet with the water carrier or other aqueous reactant. Following removal from the mold after a mold time of, for example, 3 to 7 minutes, the active filter composite material may be handled without damage though full curing and drying requires additional time up to, for example, 8 hours at room temperature.

The molding process itself can be automated using separate pumps and lines for the aqueous phase and prepolymer phase with a metering system introducing the two reactants through a rotary mixer and into the desired mold configurations. The respective pumps for the aqueous phase and prepolymer phase are selected and adjusted for selected flow rates to achieve the ratios of ingredients in the ranges set forth in the examples. The rotary mixer may be cooled and the PH of the reaction mixture adjusted to slow the reaction while the reactants introduced into the rotary mixer pass through the shaft mounted paddles, pushed by the respective pumps in the aqueous and prepolymer phase lines directly into the molds.

It is apparent that in the examples 1 thru 5 the activated charcoal powder comprises 30% to 50% by weight of the aqueous phase aqueous slurry. After foam polymerization reaction with the prepolymer the activated charcoal powder constitutes approximately 20% to 50% by weight of the cured and dried active filter composite material because of the evaporization of most of the water from the composite material. The aqueous phase and prepolymer phase are mixed together in substantially equal proportions but varying over a range of ratios from 1/1 to 2/1 so that the phases vary in percentage of the reaction mixture from 33% to 66% of the reaction mixture.

TABLE II

| EXAMPLE | 2 | 3 | 4 | 5 |
|---|---|---|---|---|
| WATER | 30 gms | 0 gms | 21.2 gms | 22.2 gms |
| PLURONIC F88 10% | 3.3 | | | |
| LIQUID SOAP | | 23.3 | | |
| PPG 1025 | | 2.5 | 4.24 | 2.22 |
| SCHERCOPOL DMS-NA | | 7.5 | 4.24 | 6.66 |
| FRAGRANCE | | | 3.18 | 6.66 |
| MONAMID | | | .53 | |
| CHARCOAL | 33.3 | 33.3 | 33.3 | 22.2 |
| TREPOL | 33.3 | 33.3 | 33.3 | 40.0 |
| % CHARCOAL OF DRY WEIGHT | 50% | 40.5% | 43.4% | 28% |

EXAMPLES 6 AND 7

The ingredients and proportions of Example 6 are summarized in Table III. Approximately 150 grams of foam polymerization reaction mixture was reacted from 75 grams of aqueous phase with 75 grams of prepolymer phase. In the aqueous phase approximately 30.66 grams of Barnebey-Cheney YF activated carbon powder, smaller than 200 mesh size was mixed in 25.3 grams of water, 18.75 grams of baby shampoo or other liquid soap and 0.255 grams of Pluronic P75 surfactant. The liquid shampoo provided additional water while the shampoo ingredients including soap and sodium laureth sulphate provided additional active surfactant ingredients.

The prepolymer phase in Example 6 is HYPOL 3000 polyisocyanate capped polyoxyethylene polyol prepolymer having a reaction functionality of the prepolymer molecules greater than 2. HYPOL 3000 is available from W. R. Grace Company of New York. The polyisocyanate is reacted with the polyol so that the reaction product, i.e. the capped product is substantially void of reactive hydroxy groups while containing more than 2 reactive isocyanate sites or NCO groups per average molecule. Thus, the average isocyanate functionality of this prepolymer is greater than 2 and in the range of 2.0 to 2.8.

After foam polymerization the 150 grams wet weight of reaction products was dried and cured with application of external heat at 150° for 14 hours and re-weighed at 106 grams after losing substantially all of the initial water by evaporation. The original size also decreased in drying from approximately 64 cubic inches to 53.4 cubic inches. After drying, the activated charcoal powder constituted 28.9% by weight of the molded product or approximately 30% while the HYPOL prepolymer constituted 70.7% by weight of the molded product or approximately 70%.

Example 7 follows the same procedure as Example 6 with ingredients in the same proportion but different in quantity as set forth in Table III.

TABLE III

| REACTANTS | EXAMPLE 6 Gram Weight | EXAMPLE 7 Gram Weight | EXAMPLES 6 & 7%/ Weight Total |
|---|---|---|---|
| WATER | 25.30 | 54 | 16.87 |
| PLURONIC P75 | .255 | .54 | .17 |
| CHARCOAL | 30.66 | 65.4 | 20.44 |
| BABY SHAMPOO | 18.75 | 40 | 12.5 |
| HYPOL 3000 | 75.0 | 160 | 50 |
| TOTAL | 150.0 | 319.94 | 99.98 |
| REACTANTS | | | |

EXAMPLE 8

The quantities and proportions of reaction products for Example 8 are set forth in Table IV following the procedures of the previous examples.

TABLE IV

| REACTANT | % TOTAL WET | % TOTAL DRY |
|---|---|---|
| WATER | 32.34 | |
| PLURONIC P75 | .46 | .68 |
| CHARCOAL | 20.6 | 30.71 |
| HYPOL 3000 | 40 | 59.64 |
| TDI | 6 | 8.94 |

EXAMPLE 9

Example 9 provides an embodiment of the active filter material suitable for shredding applications. In such applications it is advantageous to grind or shred the active filter material into fragments comparable in size to, for example, granular activated carbon in the larger mesh size ranges such as the standard Tyler or U.S. mesh sizes of, for example, 4 to 50. Such granular form of the active filter material further reduces the pressure drop and resistance to flow through a comparable width of material and furthermore is useful in conventional cartridge applications for filling cartridges of any configuration with the fragmented or granular pieces.

Unlike the large mesh size granular activated carbon, however, the granular or shredded active filter material comprises a granular substrate or shredded reticulated foam substrate supporting the composite bonded active surface powder particles of fine powder mesh size and far greater surface area exposure. Thus, the ground, shredded or granular form of the active filter material of the present invention provides the advantages of both larger size granules and fine powder with greater surface area exposure. Yet the fine powder mesh size activated charcoal particles or other active surface particles are securely bonded to the granules to prevent release in a flowing gas or liquid. In this manner the present invention can be used directly in conventional applications such as filter cartridges which are packed with granules.

To achieve this result in Example 9 an aqueous slurry was prepared by mixing 35 grams of deionized H₂O, 1.6 grams of 10% solution F88 Pluronic surfactant, 20.3 grams of Barnebey-Cheney Type YF TM activated carbon 200 mesh powder. In order to increase the specific gravity of the final active filter material so that upon shredding it would sink, for example, in the water to be filtered, 24.4 grams of Nyco 1100-4 TM Wollastonite calcium metasilicate powder filler material was also added to the aqueous phase. The wet weight of the aqueous phase was therefore 81.24 grams. The prepolymer phase was provided by 18.76 grams of the TREPOL TM prepolymer referred to in previous examples. Thus, the ratio of aqueous phase to polymer phase in Example 9 was 4.33 to 1 and the relative percentages of the ingredients or reactants is set forth in Table V.

TABLE V

| REACTANT | % AQUEOUS | % POLYMER | % TOTAL WET WEIGHT |
|---|---|---|---|
| DEIONIZED H$_2$O | 43 | | |
| PLURONIC F88 10% SOLUTION | 2 | | |
| ACTIVATED CARBON B-C TYPE YF | 25 | | |
| WOLLASTONITE | 30 | | |
| TREPOL | | 100 | |
| AQUEOUS PHASE | | | 81.24 |
| POLYMER PHASE | | | 18.76 |

The aqueous and prepolymer reactants were reacted and polymerized in a suitable container to provide the "bun" for grinding or shredding. Grinding or shredding may be accomplished, for example, using a suitable hammer mill or other appropriate shredder or grinder.

By adjusting the relative ratio of the aqueous phase to prepolymer phase in the range of approximately 5 to 1 a friable bun of lower tensile strength is provided suitable for shredding into a desired granular or fragmented size. For shredding or grinding applications, a ratio of aqueous phase to polymer or prepolymer phase in the vicinity of 5 to 1 and in the range of up to 8 to 1 is suitable. The upper limit of the ratio range, for example, approximately 8 to 1 is the reduction in the tensile strength of the resulting foam substrate and active filter material below an acceptable level.

On the other hand the lower limit of the ratio range of aqueous phase to polymer or prepolymer phase is the reduction in filter activity below an acceptable level as a result of the decreasing spatial density of the additive active surface particle powder as the ratio is reduced. Substantially equal proportions of aqueous phase and polymer phase have been found satisfactory according to the examples of the present invention at the lower end of the ratio range. Thus, according to the invention the aqueous phase and polymer or prepolymer phase are reacted together in a ratio by weight over the range of approximately 1/1 to 8/1.

Further adaptation of Example 9 of the invention for liquid filtering applications and in particular for filtering water is achieved by addition of a silicon additive such as organo functional silane for greater bonding adhesion of the powder particles to the substrate particularly in the presence of water. To accomplish this, silane is added to the aqueous phase in the amount by weight, for example, of approximately 0.5% of the aqueous phase to each 4% by weight of the dry charcoal powder in the aqueous phase. The silicon additive becomes an integral reactant of the polymerization reaction and results in additive bonds between the substrate and powder particles in the final composite active filter material. The silicon additive assures that the powder particles will not be released from the active filter material upon immersion in water or other liquid.

Increase or variation in the ratio of aqueous phase to polymer or prepolymer phase in the reaction mixture according to the invention has a number of effects. Increase in the ratio of aqueous phase to prepolymer decreases the tensile strength of the polymerization product for matching the integral strength to the application and makes the polymerization product more friable, for example, for shredding and fragmenting applications. It also reduces the amount and density of polymer in the resulting product and therefore the cost. Softness also increases with increase in the aqueous phase.

For molding and sheet product applications a higher tensile strength is desired and is achieved by using a ratio of aqueous phase to prepolymer of, for example, 1 to 1. The resulting polymerization product may have a tensile strength of, for example, 50 psi in comparison to a tensile strength of 10 psi at a ratio of 5 to 1. The higher tensile strength formulation may be suitable for slicing into sheets or strips with sufficient strength to retain shape integrity for application in belts for humidifiers, oil burner filters, ash tray filters and other filter applications.

EXAMPLE 10

Ten grams of activated carbon fine powder 325 U.S. screen mesh charcoal powder Type YF ™ from Barnebey-Cheney was mixed in 10 grams of Freon ™ trichloromonofluoromethane solvent for providing temporary evaporable protective layer or barrier over the active surfaces of the charcoal powder. The mixture of 10 grams fine powder activated charcoal and 10 grams liquid Freon ™ was then mixed in 8 grams of water with a small amount of surfactant liquid to provide a still pourable though viscous aqueous phase. The aqueous phase was mixed with 10 grams of TREPOL prepolymer to provide the reaction mixture which was physically stirred and poured into a mold. Thus, the ratio of aqueous phase to prepolymer phase was 2.8 to 1. Within the aqueous phase the activated charcoal powder comprised approximately 35% by weight.

As the percentage of activated charcoal powder in the aqueous phase increases, the viscosity of the aqueous phase increases and pourability decreases. In Example 10 the aqueous phase was still pourable though viscous. As the percentage of charcoal powder and therefore the viscosity increases in the aqueous phase, pourability may be increased or restored by adding an electrolyte such as Darvan ™, R. T. Vanderbilt, Inc., Norwalk, Conn., or Dispec N-40 from Allied Chemical, or surfactant material or surfactant liquids may be added. Suitable surfactants of the type illustrated in the previous examples including anionic, nonionic, cationic, and amphoteric surfactants may be used. According to the present invention the percentage of active surface particle powder in the aqueous phase may be increased as long as the aqueous phase remains pourable though viscous or moldable. The upper limit of the percentage composition of activated charcoal powder or other active surface particle powder is the limit such as, for example, 75% by weight of active surface particle powder which assures sufficient water to cover the active surfaces with a protective layer and which remains moldable or pourable though viscous. The lower limit of percentage composition is the lower limit, for example, 15% by weight at which the density of active surface particle powder is sufficient to still be useful as an active filter material for performing a filtering function. Below this limit, the density may become too low to be useful as a filter.

While the invention has been described with reference to applications for breathing masks and respirators and to water filtering, it is apparent that the active filter composite material, according to the invention, is suited for a variety of additional applications including air purifying and gas filters, organic vapor filters, a variety of liquid and fluid filters, molecular sieves, catalysts, odor adsorbents, etc. The invention is therefore intended to cover all variations and equivalents within the scope of the following claims.

We claim:

1. An improved active filter material comprising:
    an open hydrophilic foam substrate and bonded active surface particle powder composite generated by foam polymerization of a prepolymer phase with an aqueous phase, said foam substrate comprising open foam characterized by relatively low pressure drop and low resistance to flow through the foam substrate;
    said aqueous phase comprising a pourable and flowable slurry mixture of an aqueous liquid carrier, active surface particle powder, and surfactant wetting agent means, said aqueous phase comprising approximately 15% to 50% by weight of the active surface particle powder and comprising sufficient aqueous liquid carrier for a pourable aqueous phase and for providing a protective liquid layer or coating over the active surfaces of the active surface powder particles;
    said prepolymer phase comprising a hydrophilic polyurethane NCO-terminated prepolymer receptive to the aqueous phase for foam polymerization upon mixing with the aqueous phase;
    said aqueous phase and prepolymer phase being mixed together in ratio by weight of aqueous phase to prepolymer phase in the range of approximately 1/1 to 8/1 so that the mixture is initially pourable and flowable for molding;
    said active filter material comprising an open hydrophilic foam substrate with active surface powder particles distributed over and bonded to the surfaces of the hydrophilic foam substrate, the major portion of active surfaces of the powder particles being substantially protected by the layer of liquid carrier from obstruction and deactivation during the foam polymerization and being exposed for active filter functioning.

2. The active filter material of claim 1 wherein the active surface particle powder comprises activated charcoal powder.

3. The active filter material of claim 2 wherein the activated charcoal powder is selected in the preferred fine powder range size of approximately 325 mesh and smaller.

4. The active filter material of claim 1 where the open hydrophilic foam substrate and bonded active surface particle powder material composite comprises by dry weight approximately 12% to 66% activated charcoal powder.

5. The active filter material of claim 1 wherein the open hydrophilic foam substrate comprises reticulated foam with the active surface particle powder distributed over and bonded to the webs of the reticulated foam.

6. The active filter material of claim 1 wherein the open hydrophilic foam substrate comprises open cell foam.

7. The active filter material of claim 1 wherein the active surface particle powder is pretreated by soaking in an inert organic liquid before mixing in the aqueous phase.

8. The active filter material of claim 7 wherein the inert organic liquid comprises fluorotrichloromethane.

9. A respirator comprising the active filter material of claim 1 molded in the configuration of a single piece face mask respirator.

10. The active filter material of claim 1 wherein said active filter material is molded in the configuration of a single piece face mask respirator shaped to fit over the nose and mouth of a wearer, said respirator having a thicker central portion for passing and filtering breathing air and tapering to a flange portion around the perimeter for abutting against the face of a wearer to exclude passage of air at the edge of the respirator.

11. The active filter material of claim 10 wherein the respirator is formed with an impervious skin over the flange and perimeter of the respirator to increase pressure drop through the respirator at the perimeter and constrain breathing air to pass through the thicker central portion of the respirator.

12. The active filter material of claim 1 wherein the composite is shredded into fragments.

13. A method for producing an active filter material comprising:
    preparing an aqueous phase comprising a pourable slurry mixture by mixing active surface particle powder and surfactant wetting agent means in sufficient aqueous liquid carrier to provide a pourable aqueous phase comprising approximately 15% to 50% by weight of the active surface particle powder and soaking the active surface particle powder to provide a protective liquid layer or barrier over the active surfaces of the powder particles;
    mixing the aqueous phase in substantially equal or greater proportion by weight with a prepolymer phase comprising a hydrophilic urethane NCO-terminated prepolymer receptive to the aqueous phase so that the mixture is initially pourable and flowable, said aqueous phase and prepolymer phase being mixed together in ratio by weight in the range of approximately 1/1 to 8/1, and foam polymerizing the aqueous phase and prepolymer phase thereby providing an open hydrophilic foam substrate and bonded active surface particle powder composite with the active surface powder particles distributed over and bonded to the surfaces of the open hydrophilic foam substrate;
    and evaporating the protective liquid layer over the active surfaces of the powder particles by drying the resulting composite whereby the active surfaces of the powder particle material are exposed for active filter functioning.

14. The method of claim 13 wherein the active surface particle powder is selected in the preferred fine powder size range of approximately 325 mesh or smaller.

15. The method of claim 13 comprising the further step of introducing the mixed aqueous phase and prepolymer phase into a mold for foam polymerization in the mold to provide a shaped product of said active filter material.

16. The method of claim 15 wherein the mold is in the configuration of a face mask respirator.

17. The method of claim 13 comprising the step of pretreating the active surface particle powder by soaking in an inert volatile organic liquid before mixing in the aqueous phase.

18. The method of claim 13 wherein the surfactant wetting agent means is selected from the group consisting of anionic, cationic, nonionic, and amphoteric surfactants.

19. The method of claim 13 further comprising the steps of providing a mold in the configuration of a face mask respirator having a thicker central portion and tapering in width to a flange portion at the perimeter of the mold;

spraying the perimeter of the mold with a layer of impervious liquid resin; and introducing the mixed aqueous phase and prepolymer phase into the mold for foam polymerization filling the mold, thereby providing an impervious skin around the perimeter of the respirator to increase pressure drop at the perimeter of the respirator and constrain breathing air to pass through the thicker central portion.

20. The method of claim 19 wherein the impervious liquid resin comprises polyvinyl chloride.

21. The method of claim 13 further comprising the step of shredding the composite into fragments.

22. The method of claim 21 further comprising the step of pouring the fragments into a filter cartridge container.

23. An improved active filter material comprising:
a reticulated hydrophilic foam substrate and bonded active surface particle powder composite generated by foam polymerization of a prepolymer phase with an aqueous phase, said hydrophilic foam substrate comprising a reticulated foam characterized by relatively low pressure drop and low resistance to flow through the foam substrate;

said aqueous phase comprising a pourable and flowable slurry mixture of water, active surface particle powder, and surfactant wetting agent means, said aqueous phase comprising approximately 15% to 50% by weight of the active surface particle powder, and sufficient water to provide a liquid carrier for a pourable and flowable aqueous phase and for providing a temporary protective liquid layer or coating over the active surfaces of the powder particles;

said prepolymer phase comprising a hydrophilic polyurethane NCO-terminated prepolymer receptive to the aqueous phase for foam polymerization upon mixing with the aqueous phase;

said aqueous phase and prepolymer phase being mixed together in ratio by weight, in the range of approximately 1/1 to 8/1 so that the mixture is initially pourable and flowable for molding;

said active filter material comprising a reticulated hydrophilic foam substrate with the active surface powder particles distributed over and bonded to the webs of the reticulated hydrophilic foam substrate, the major portion of the active surfaces of said powder particles being substantially protected by a hydration layer from obstruction and deactivation during the foam polymerization and exposed for active filter functioning.

24. The active filter material of claim 23 wherein the active surface particle powder comprises activated charcoal powder.

25. The active filter material of claim 24 wherein the activated charcoal powder is selected in the preferred fine powder range size of approximately 325 mesh and smaller.

26. The active filter material of claim 23 wherein the surfactant wetting agent means is selected from the group consisting of polyether surfactant, polypropylene glycol, soap, and sodium laureth sulfate.

27. The active filter material of claim 23 wherein the prepolymer phase comprises the reaction product of polyol and polyisocyanate.

28. The active filter material of claim 27 wherein the prepolymer phase comprises the reaction product of polyethylene glycol and toluene diisocyanate.

29. The active filter material of claim 27 wherein the aqueous phase and prepolymer phase are mixed in substantially equal proportions by weight.

30. The active filter material of claim 27 wherein the hydrophilic urethane prepolymer is characterized by a reaction functionality less than 2.

31. The active filter material of claim 23 where the reticulated hydrophilic foam substrate and bonded active surface particle powder composite comprises by dry weight approximately 12% to 66% activated charcoal powder.

32. The active filter material of claim 23 wherein the active surface particle powder is pretreated by soaking in an inert volatile organic liquid before mixing in the aqueous phase.

33. The active filter material of claim 32 wherein the inert organic liquid comprises trichloromonofluoromethane.

34. The active filter material of claim 23 wherein the active filter material is molded in the configuration of a face mask respirator.

35. A gas and vapor filtering face mask respirator comprising the active filter material of claim 25 molded in the configuration of a face mask respirator.

36. The active filter material of claim 25 wherein the composite is shredded into fragments for filling filter cartridges.

37. A method for producing an active filter material comprising:

preparing an aqueous phase comprising a pourable and flowable slurry mixture by mixing active surface particle powder and surfactant wetting agent means in sufficient water to provide a pourable aqueous phase comprising approximately 15% to 50% by weight of active surface particle powder and soaking the activated surface particle powder to provide a protective liquid layer or barrier over the active surfaces of the powder particles;

mixing the aqueous phase in substantially equal or greater proportion by weight with a prepolymer phase comprising a hydrophilic urethane NCO-terminated prepolymer receptive to the aqueous phase, so that the mixture is initially pourable and flowable, and foam polymerizing the aqueous phase and prepolymer phase thereby providing a reticulated hydrophilic foam substrate and bonded active surface particle powder composite with the active surface powder particles distributed over and bonded to the webs of the hydrophilic foam substrate;

and evaporating the protective liquid layer from the active surfaces of the powder particles by drying the resulting composite and exposing the major portion of the active surfaces of the powder particles for active filter functioning.

38. The method of claim 37 wherein the prepolymer phase comprises the reaction product of polyethylene glycol and toluene diisocyanate having a reaction functionality less than 2.

39. The method of claim 37 wherein said hydrophilic urethane prepolymer comprises a reaction product of polyol and polyisocyanate.

40. The method of claim 37 wherein the active surface particle powder comprises activated charcoal powder.

41. The method of claim 40 wherein the activated charcoal powder is selected in the preferred fine powder size range of approximately 325 mesh and smaller.

42. The method of claim 37 comprising the step of pretreating the active surface particle powder by soaking in an inert organic liquid before mixing in the aqueous phase.

43. The method of claim 37 comprising the further step of introducing the mixed aqueous phase and prepolymer phase into a mold for foam polymerization in the mold to provide a shaped product of said active filter material.

44. The method of claim 43 wherein said mold is in the configuration of a face mask respirator.

45. The method of claim 41 further comprising the step of shredding the composite into fragments for filling filter cartridges.

* * * * *